United States Patent
Kanazawa et al.

(10) Patent No.: US 7,649,299 B2
(45) Date of Patent: Jan. 19, 2010

(54) ROTATING ELECTRICAL MACHINE AND ALTERNATING-CURRENT GENERATOR

(75) Inventors: Hiroshi Kanazawa, Hitachiohta (JP); Takayuki Koyama, Hitachi (JP); Masashi Kitamura, Mito (JP); Susumu Tajima, Hitachinaka (JP); Kenya Takarai, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 11/834,933

(22) Filed: Aug. 7, 2007

(65) Prior Publication Data
US 2008/0079322 A1    Apr. 3, 2008

(30) Foreign Application Priority Data
Sep. 28, 2006    (JP) .............................. 2006-263722

(51) Int. Cl.
    H02K 1/12      (2006.01)
    H02K 3/04      (2006.01)
(52) U.S. Cl. ................................. 310/257; 310/216.023
(58) Field of Classification Search .................... 310/58, 310/60 R, 61, 62, 216–218, 257
See application file for complete search history.

(56) References Cited

U.S. PATENT DOCUMENTS

| | | | | |
|---|---|---|---|---|
| 4,475,873 A | * | 10/1984 | Jensen et al. | 417/422 |
| 6,078,116 A | * | 6/2000 | Shiga et al. | 310/60 R |
| 6,373,166 B1 | * | 4/2002 | Asao et al. | 310/263 |
| 6,663,362 B1 | * | 12/2003 | Lentz et al. | 417/423.7 |
| 6,946,771 B2 | * | 9/2005 | Cros et al. | 310/257 |
| 2002/0041100 A1 | | 4/2002 | Yumita et al. | |
| 2004/0239207 A1 | * | 12/2004 | Kloepzig et al. | 310/254 |

FOREIGN PATENT DOCUMENTS

| | | |
|---|---|---|
| JP | 53-145114 | 10/1979 |
| JP | 56-20369 | 2/1981 |
| JP | 7-298588 A | 11/1995 |
| JP | 2002-89429 A | 3/2002 |
| JP | 2002-291178 A | 10/2002 |
| JP | 2005-151785 A | 6/2005 |
| JP | 2005-532775 A | 10/2005 |

OTHER PUBLICATIONS

Japanese Office Action dated Nov. 4, 2008 (Three (3) pages).
Japanese Office Action dated Apr. 14, 2009 (Two (2) pages).

* cited by examiner

*Primary Examiner*—Tran N Nguyen
(74) *Attorney, Agent, or Firm*—Crowell & Moring LLP

(57) ABSTRACT

It is made easy for a stator winding to be wound around a stator core and degradation in efficiency is prevented as much as possible. A stator (6) includes a plurality of phases, i.e., of circumferentially divided stator magnetic poles (6a, 6b, 6c). The stator magnetic poles (6a, 6b, 6c) are each composed of an arcuate stator core (13) having a plurality of axially extending claw poles (16b) and a circumferentially elliptically wound stator winding (14). The stator magnetic poles (6a, 6b, 6c) are magnetically divided; therefore, magnetic flux leakage is reduced to improve efficiency. Air flowing between the stator magnetic poles (6a, 6b, 6c) can improve a cooling effect.

5 Claims, 8 Drawing Sheets

ELECTRIC ANGLE 30°

ROTATING ELECTRICAL MACHINE AND ALTERNATING-CURRENT GENERATOR

BACKGROUND OF THE INVENTION

1. Field of the Invention

The present invention relates to a rotating electrical machine and an alternating-current generator each of which is provided with a plurality of stator windings.

2. Description of the Related Art

General stators used for rotating electrical machines are configured to include a stator core formed with a plurality of slots extending in a circumferential direction and a plurality of stator windings each of which is wound around a corresponding one of the slots. This poses a problem in that if the number of slots formed on the stator core is increased in order to ensure the number of magnetic poles, work for winding the stator windings in the slots is complicated to degrade workability.

To eliminate such a problem, as disclosed in JP-A-2005-532775, a stator is conceived in which a plurality of stator windings are each wound circumferentially and a plurality of claw poles are each formed to pass the inside opening and outside of each stator winding. With such a configuration, workability encountered when the stator winding is wound can be improved while ensuring the number of magnetic poles.

SUMMARY OF THE INVENTION

In JP-A-2005-532775, since a stator core is integrally formed in a circumferential direction, however, magnetic flux generated around the stator winding tends to leak to another stator winding side, which degrades efficiency.

It is an object of the present invention to provide a rotating electrical machine and an alternating-current generator that make it possible for a stator winding to be wound on a stator core and prevent degradation in efficiency as much as possible.

According to an aspect of the present invention, there is provide a rotating electric machine in which a stator includes a plurality of stator windings circumferentially arranged at predetermined intervals and a stator core including a stator yoke and a plurality of claw poles extending from the stator yoke, passing through an inside opening and an outside of the stator winding and protruding toward the side of the rotor, the stator yoke being magnetically divided in association with the stator winding.

According to another aspect of the present invention, there is provided a rotating electric machine in which a stator includes a plurality of stator windings circumferentially arranged at predetermined intervals and a stator core configured to be provided along a circumferential portion of the stator winding and to form a plurality of magnetic poles on the side of the rotor, the stator core being divided for each of the stator windings.

According to another aspect of the present invention, there is provide an alternating-current machine in which a stator includes a plurality of stator windings circumferentially arranged at predetermined intervals and a stator core including a stator yoke and a plurality of claw poles extending from the stator yoke, passing through an inside opening and outside of the stator winding and protruding toward the side of the rotor, the stator yoke being magnetically divided in association with the stator winding, and a magnetic flux generated by the rotor passes through the claw poles to be interlinked with the stator winding, the magnetic flux interlinked with the stator winding varying based on rotation of the rotor to induce voltage in the stator winding.

The rotating electric machine and alternating-current generator of the present invention reduce magnetic flux leakage to improve efficiency.

DETAILED DESCRIPTION OF THE PREFERRED EMBODIMENTS

First Embodiment

Figure 1:
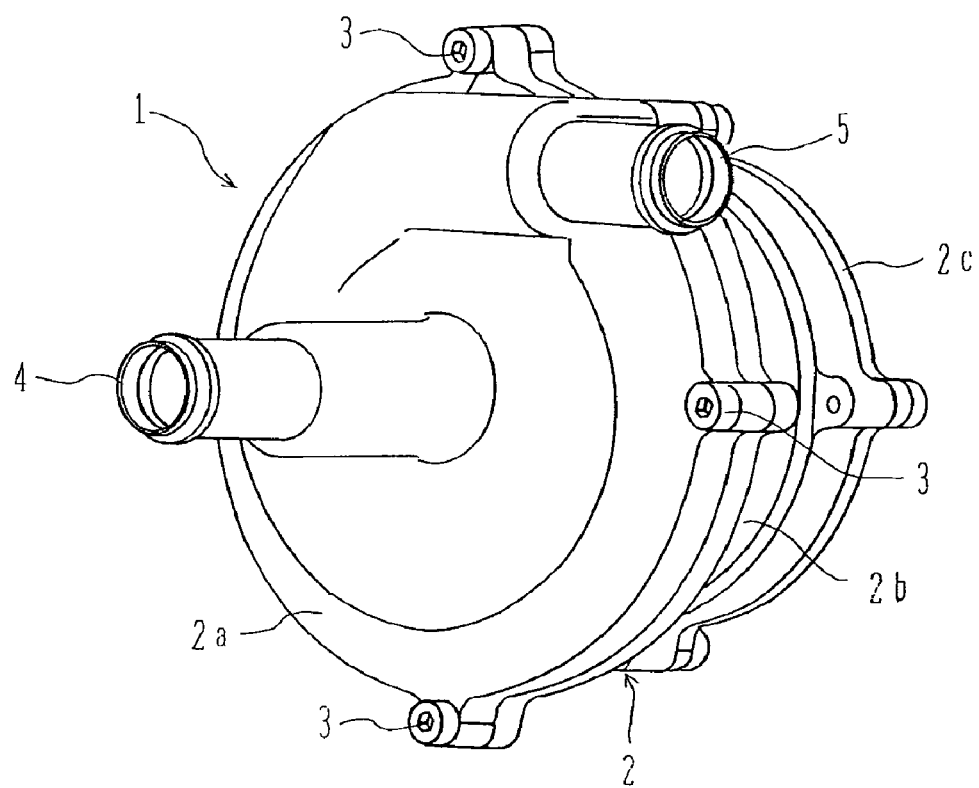
FIG. 1 is an external view of an electric water pump according to a first embodiment.
Figure 2:
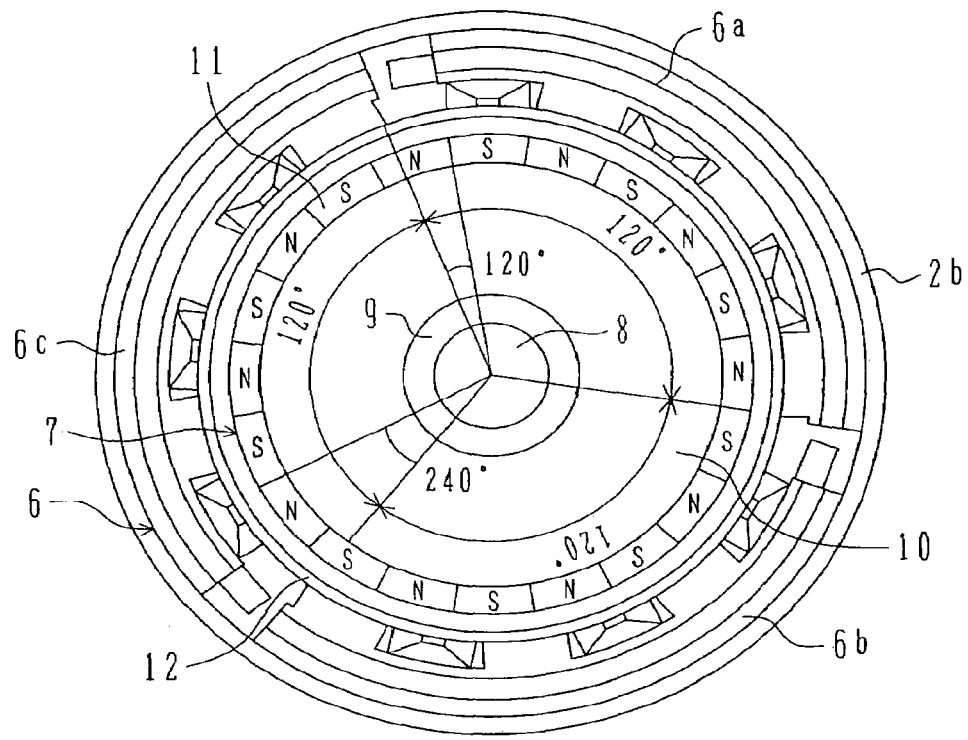
FIG. 2 is a front cross-sectional view of a motor portion of the electric water pump of FIG. 1.
Figure 3:
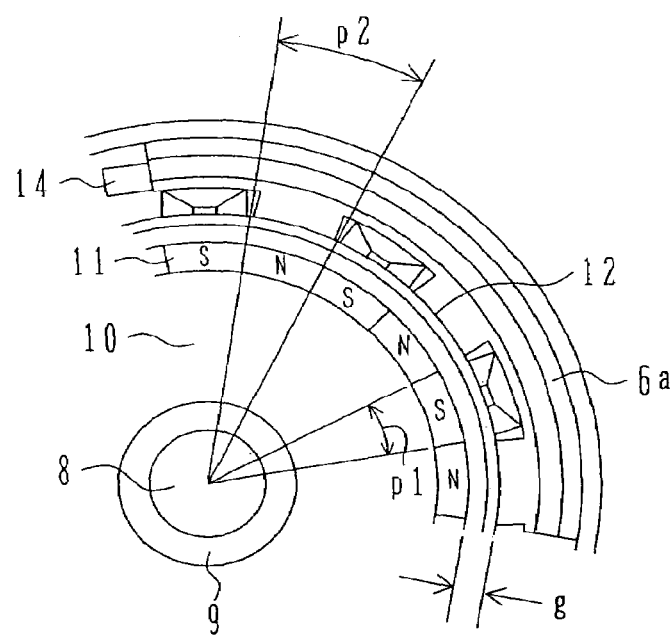
FIG. 3 is an enlarged view of a U-phase portion of FIG. 2.
Figure 4:
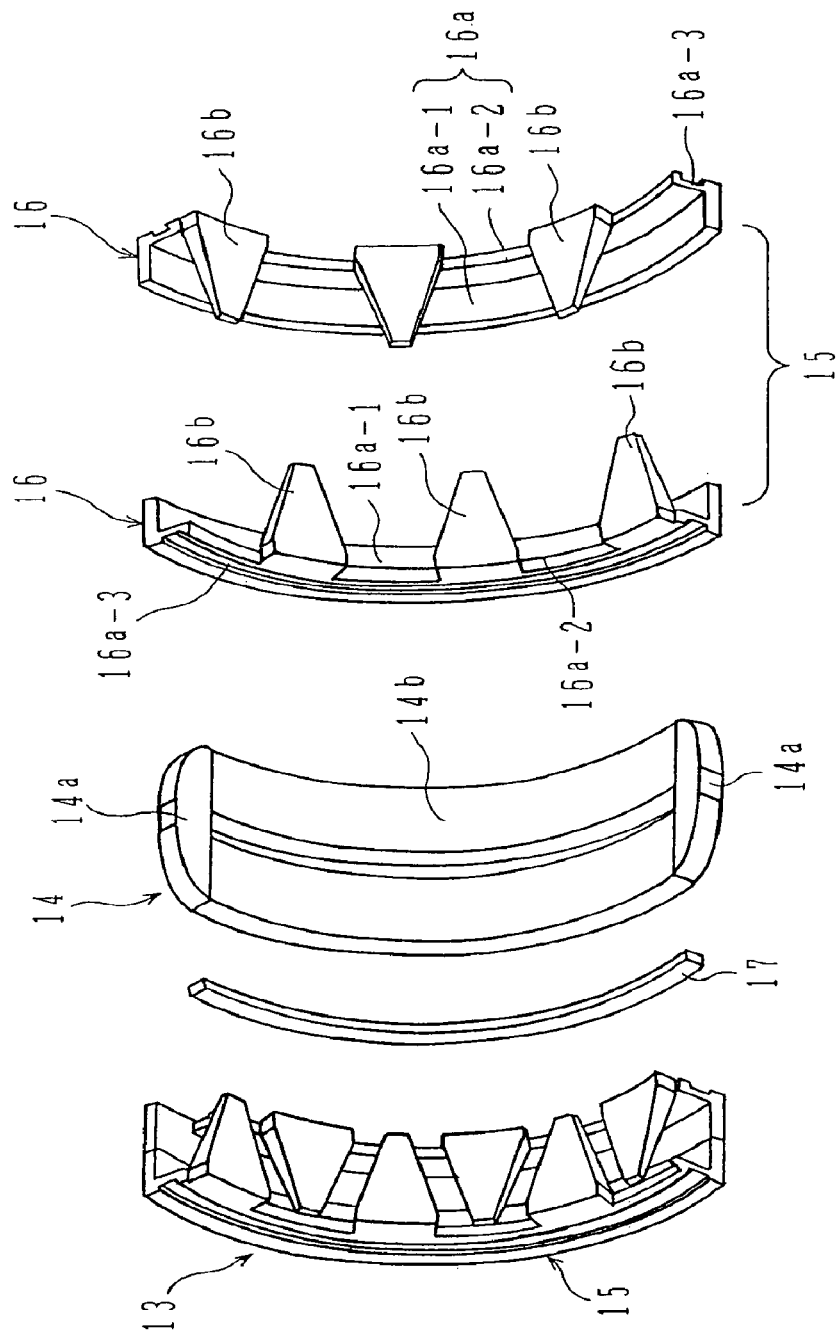
FIG. 4 is a perspective view of separate component parts included in a W-phase portion of a disassembled stator in the first embodiment.

A description will be made of a first embodiment of a product using a rotating electric machine embodying the present invention, taking an electric water pump mounted on an automobile with reference to FIGS. 1 to 4. FIG. 1 is an external appearance view of an electric water pump. FIG. 2 is a front cross-sectional view of a motor portion of the electric water pump. FIG. 3 is an enlarged view of a U-phase portion of FIG. 2. FIG. 4 is a perspective view of separate component parts included in a W-phase portion of a disassembled stator.

The electric water pump 1 shown in FIG. 1 is used to cool an electric motor for drive, an inverter, the inside of a cabin, an internal combustion engine, etc. used in hybrid vehicles, electric vehicles or the like and serves to deliver to a heat generation source cooling water as a cooling medium cooled by a radiator.

The electric water pump 1 is such that an electric motor as a rotating electric machine and a pump construct are accommodated in a housing 2, and a pump is rotatably activated by the electric motor to discharge cooling water. This housing 2 includes an almost-bowl-like front bracket 2a, a cylindrical housing main body 2b and a plate-like rear plate 2c, which are joined together with fixation screws 3. Such component parts are molded with an aluminum material as a nonmagnetic material.

The front bracket 2a accommodates the pump construct therein and includes a water supply port 4 provided at a radially almost-central position and a water discharge port 5 provided on the outer circumferential side to be opened in an almost-tangential direction. Incidentally, the pump construct not shown adopts a centrifugal pump in which an impeller is rotatably driven by the electric motor to discharge the cooling water led from the water supply port 4 by a centrifugal force, from the discharge port 5. The cooling water is not mere water but antifreeze liquid containing ethylene glycol used as cooling water for automobiles.

The housing main body 2b accommodates the electric motor therein and the impeller of the pump construct is attached to the output portion of the electric motor. One end opening of the housing main body 2b is sealed by the rear plate 2c.

An electrical motor portion as the rotating electrical machine is next described. Referring to FIG. 2, the electric motor portion is configured to include a stator 6 secured to the inner circumference of the housing main body 2b and a rotor 7 provided on the inner circumference of the stator 6 rotatably with respect to the stator 6.

A shaft 8 is disposed at the central portion of the rotor 7. The rotor 7 is constructed slidably with respect to the shaft 8 via a sliding bearing 9 provided around the shaft 8. A yoke 10 constituting a magnetic circuit is provided on the outer circumference of the sliding bearing 9 and a permanent magnet 11 is provided on the outer circumferential portion of the yoke 10. In FIG. 2, the number of the magnetic poles of the permanent magnet 11 is 20 poles and magnetic poles, N-poles and S-poles, are alternately arranged on the circumference. For the rotor 7, the sliding bearing 9, yoke 10 and permanent magnet 11 can be fabricated by axially stacking copper powder, magnetic powder and magnet powder, respectively, and by compacting them by a press. An impeller (not shown) is secured to the axial end face of the rotor 7. The impeller (not shown) is rotated along with the rotation of the rotor 7, whereby the pump construct discharges cooling water. Further, a partition wall 12 made of a nonmagnetic material such as aluminum, resin or the like is provided on the outer circumferential portion of the rotor 7 so as to prevent the entry of the cooling water into the stator side.

The stator 6 is next described. The stator 6 is disposed on the inner circumferential side of the housing main body 2b mentioned above so as to be divided into a U-phase magnetic pole 6a, a V-phase magnetic pole 6b and a W-phase magnetic pole 6c. Since the stator 6 of the present invention is designed to have three phases, the number of the stators 6 is three and the stators 6 are arranged at about 120 degrees intervals in view of the balance of mechanical arrangement. More specifically, to have a phase difference of three phases, the stator magnetic poles 6a, 6b, 6c of the phases are arranged to have the phase differences of 120 and 240 degrees with the electric angles of the permanent magnet 11 provided on the rotor 7. Since such phases are not mechanically connected to each other, the stator magnetic poles 6a, 6b, 6c are fixedly supported at their inner and outer circumferences by the partition wall 12 and housing main body 2b, respectively, mentioned above.

Further, a description is made of a detailed structure of the stator magnetic poles 6a, 6b, 6c of the stator 6 taking a W-phase magnetic pole shown in FIG. 4 as an example. Each of the stator magnetic poles 6a, 6b, 6c of the stator 6 is composed of a stator core 13 and a stator winding 14 wound in the stator core 13.

The stator core 13 is composed of a pair of axially divided stator sub-cores 15 and each of the stator sub-cores 15 is composed of a pair of axially divided stator core constituent members 16. In short, the stator core 13 is composed of four stator core constituent members 16, which have the same shape. The stator core constituent member 16 is made of a dust core whose surface is coated with an insulating member, the dust core being hardened by compacting iron powder. One of the stator core constituent members 16 is formed by integrally molding a stator yoke 16a and three claw poles 16b. The stator yoke 16a has an arcuately formed strip-like portion 16a-1 and a key groove portion 16a-2 provided to protrude toward the inner circumferential side from one axial end of the strip-like portion 16a-1. The claw pole 16b axially extends from the key groove portion 16a-2 of the stator yoke 16a. The three claw poles 16b are each formed to be tapered, that is, to be almost trapezoidal and are spaced apart at almost equal intervals from a circumferential end of the key groove portion 16a-2. Thus, the claw pole 16b is not arranged on the other side of the key groove portion 16a-2. The claw poles 16b of the two stator core constituent members 16 configured described above are axially assembled with each other so as to be alternately arranged, thereby forming the stator sub-core 15. Further, the two stator sub-cores 15 are axially assembled with each other so as to be symmetrical, thereby forming the stator core 13. In this case, the opposed claw poles 16b of the stator core constituent members 16 are brought into contact with each other to contribute to an increase in mechanical strength and to increase a coefficient of use of magnetic flux, thereby providing an effect of increased output. Incidentally, the stator cores 15 are joined together in a state where an arcuate connecting member 17 made of a magnetic body is fitted into the key grooves 16a-3 formed on the surfaces of the stator yokes where the pair of stator sub-cores 15 are opposed to each other.

The stator winding 14 is internally wound around the stator core 13 constructed as above. The stator winding 14 is molded by deforming a cylindrically wound winding into an ellipse and by further circumferentially bending it into a saddle. The stator winding 14 is flat wound to be radially narrow and axially wide and includes a pair of coil end portions 14a formed at both circumferential ends and a pair of circumferentially wound portions 14b present between both the coil end portions 14a. The stator core constituent members 16 are assembled around the stator winding 14 at the corresponding circumferential wound portions 14b so as to be disposed between the claw poles 16b and stator yokes 16a of the different stator sub-cores 15. Thus, the claw poles 16b of the stator core 13 protrude toward the rotor 7 through the inside opening and outside of the stator windings 14. Incidentally, each of the stator core constituent members 16 constituting the stator sub-core 15 has a claw pole 16b at one circumferential end but has not a claw pole 16b at the other circumferential end. Thus, the coil end portion of the stator winding 14 largely protrudes toward one circumferential end of the stator core 13 but hardly protrudes toward the other circumferential end of the stator core 13.

In the above description, the method is adopted to which the stator winding 14 is subjected to form winding and then disposed in the stator sub-core 15. However, for instance, a pair of the stator sub-cores 15 may be bound by the connecting member and the stator winding 14 may directly be wound around such stator sub-cores. The winding used in this case may be a round wire round in cross-section as well as a rectangular wire rectangular in cross-section. Further, U-shaped separate coils may be inserted into the stator-sub cores from one end thereof and joined together at the other end by welding or caulking, thereby forming a loop coil.

A description is next made of the relationship between the magnetic pole of the rotor 7 and the U-phase stator magnetic pole 6a taking the U-phase as an example with reference to FIG. 3. As described earlier, the rotor 7 is supported rotatably around the shaft 8 and configured to include the yoke 10 and permanent magnet 11 provided on the outer circumference of the sliding bearing 9. The permanent magnet 11 in the present embodiment is magnetized to have 20 poles; therefore, an angle p1 of one pole is 18 degrees in mechanical angle. In addition, also the claw pole pitch p2 of the stator 6 in the present embodiment is 18 degrees in mechanical angle, which is equal to the magnetic pole pitch of the rotor 7. As there is a combination of the number of poles and the number of slots in a motor having windings wound through general concentrated winding, it is not necessary to make their numbers of pitches equal to each other. The claw pole pitch P2 of the stator magnetic pole 6a may be larger or smaller than the magnetic pole pitch p1 of the magnet. The claw pole pitch p2 is made slightly large or small to reduce a magnetic flux interlinked with the stator winding 14. However, the high-harmonic component of the magnetic flux interlinked with the phase winding is reduced, providing an advantage in terms of reduction in iron loss, sound and vibration. Thus, the claw pole pitch p2 may be changed as usage. Further, the claw pole pitch may not be made uniform, that is, the magnetic poles may be varied in arrangement, thereby reducing cogging torque.

Each stator core 13 is secured to the housing main body 2b and to the partition wall 12 so that a gap g as a magnetic circuit is a distance between the outer circumferential surface of the partition wall 12 and the surface of the permanent magnet 11 as shown in FIG. 3. It is configured that cooling water flows in between the permanent magnet 11 and the partition wall 12. The partition wall 12 is configured to prevent the cooling water leaking to the side of the stator 6.

The constitution of the first embodiment has been described thus far. The function and effect of the first embodiment are described below.

According to the first embodiment, the rotating electric machine for driving the pump includes the stator and the rotor. The stator includes a plurality of stator windings circumferentially arranged at predetermined intervals and a stator core. The stator core includes a stator yoke and a plurality of claw poles which protrude from the stator yoke toward the rotor side through the inside opening and outside of the stator winding. The stator yoke is configured to be divided in association with the stator winding. Thus, a magnetic flux will not leak to the other stator winding side to improve efficiency. The magnetic flux will hardly come and go between the stator windings to reduce variations of the magnetic flux between the phases.

The stator core of the first embodiment is divided into a pair of segments each located from the inside opening of the stator winding to a corresponding one of both the axial sides thereof, whereby such molded parts can be reduced in size. This can downsize a manufacturing apparatus and make it easy for the stator winding to be wound, which enhances productivity. In particular, the stator core is made of a dust core; therefore, density can be increased, which can further enhance a characteristic.

The stator core of the first embodiment is axially divided at the position of the stator winding; therefore, the stator winding can extremely easily be wound around the stator core. It becomes possible that the stator core is first formed into a wound state and then attached to the stator core. Incidentally, the same function and effect can be provided as those provided by dividing the stator core into a pair of segments each located from the inside opening of the stator winding to a corresponding of the axial sides thereof.

The stator core of the first embodiment is axially divided into the four stator core constituent members at the inside opening of the stator windings and at the position of the stator winding, and the stator core constituent members are formed to have the same shape. Thus, all the stator core constituent members can be molded by a single mold. In addition to further downsizing the manufacturing apparatus, the stator winding can further easily be wound, thereby largely enhancing the productivity. Needless to say, if the stator core is composed of a dust core, the density can further be increased.

The stator core of the first embodiment is composed of a dust core; therefore, a complicate shape can easily be molded with a manufacturing mold and the occurrence of the eddy current can be reduced as much as possible.

The stator winding of the first embodiment has the one circumferential end portion protruding from the stator core; therefore, a cooling effect can be improved by exposing it from the stator core producing heat. The other circumferential end portion of the stator winding comes into the stator core; therefore, a circumferential gap between the stator magnetic poles can be narrowed to reduce variations in the pitches of the claw poles as much as possible. As described above, the stator winding is exposed from the one circumferential end portion of the stator core and the other circumferential end of the stator winding comes into the stator core; therefore, both the function and effect, that is, cooling of the stator winding and the reduction in the variations of the claw pole pitches, can be provided. In order to provide a configuration in which the one circumferential end portion of the stator winding is exposed from the stator core and the other circumferential end portion of the stator winding comes into the stator core, it is preferable that the number of the claw poles of the stator core be even numbers for each magnetically divided stator sub-core. In this way, a wasteful portion can be reduced as much as possible.

The electric motor portion of the first embodiment is such that the rotor is disposed on the inner circumferential side of the stator core and drives the pump, the partition wall is disposed between the claw poles and the rotor, and a discharge medium to be discharged by the pump is led into the inside of the partition wall including the rotor. Therefore, it can be prevented that the stator comes into contact with the discharge medium to rust. In particular, since the first embodiment uses cooling water as a discharge medium, not only the rotor can be cooled but also the rotor side can be cooled through the partition wall.

The claw poles of the stator core of the first embodiment are each tapered, which provides the function and effect of contributing to an improvement in mechanical strength and to an improvement in coefficient of use of magnetic flux, increasing output. Further, since the claw pole is skewed, magnetic noise can be reduced. The opposed claw poles of the stator core constituent members are brought into contact with each other, which provides the function and effect of contributing to an improvement in mechanical strength and to an improvement in coefficient of use of magnetic flux, increasing output.

According to the first embodiment, the rotating electric machine for driving the pump includes the stator and the rotor. The stator includes a plurality of stator windings circumferentially arranged at predetermined intervals and a stator core. The stator core is configured to be provided along the circumferential portion of the stator winding and to form a plurality of magnetic poles on the side of the rotor, the stator core being divided on the stator winding basis. Thus, the stator core is completely divided and the coil end portion of the stator winding located at a position between the completely divided stator cores can be exposed to air. This can enhance cool performance of the stator winding. The stator core can further be subdivided, which can enhance productivity.

Since the housing of the first embodiment is made of a nonmagnetic material, a magnetic flux will not leak to the other stator magnetic poles through the housing.

Since the stator magnetic pole of the first embodiment is secured at its outer and inner circumferences to the partition wall and to the housing, it serves to reinforce the strength of the stator core. In particular, if the stator core is formed of a dust core, it is effective to reinforce the strength of the stator core.

The function and effect of the first embodiment has been described thus far. Other applicable configurations are described below.

In the first embodiment, the stator core is circumferentially divided for each stator winding as means for magnetically dividing the stator yoke. Since it is needed only to magnetically divide the stator core, the stator yokes may be integrally formed of a nonmagnetic member. In this case, it is necessary to select a material having almost the same linear expansion coefficient as the stator yoke.

In the first embodiment, the stator core is axially divided into a plurality of segments. However, if the stator winding is directly wound around the stator core, it is not necessary to axially divide the stator core. If the stator core is not divided as described above, it becomes difficult to wind the stator winding around the stator core but it becomes easy for the magnetic flux to pass through the stator core, leading to improved efficiency.

While the claw pole is formed to be tapered, that is, to be almost trapezoidal in the first embodiment, it may be formed to extend at the same width.

In the first embodiment, the stator winding is wound so that only the one circumferential end thereof protrudes from the stator core. However, in the case of emphasizing cooling, both the circumferential end of the stator windings may protrude from the stator core. On the other hand, in the case of emphasizing a reduction in variations of the claw pole pitches as when the number of the claw poles is increased, both the circumferential ends of the stator windings may not protrude from the stator core.

While the stator core is formed of a dust core in the first embodiment, since the dust core is fragile, it is preferable to mold the periphery thereof including the stator winding with a nonmagnetic insulating member such as resin. In this case, if the front surface of the inner circumference of the stator core is molded, such an insulating member can have a function of a partition wall. Further, the stator core may be formed by punching a iron plate.

The rotor of the first embodiment adopts the so-called surface magnet type in which permanent magnets are provided on the outer circumference thereof. However, it may adopt the so-called buried magnet type in which a plurality of permanent magnets are circumferentially buried inside the rotor.

If a permanent magnet is used for the rotor, in addition to a generally used ferrite magnet and neodymium magnet, the permanent magnet may be used that is obtained by binding neodymium (Nd) powder with a binder whose precursor has high affinity. Examples of the precursor having high affinity include e.g. alkoxysiloxane and alkoxysilane, which are a precursor of $SiO_2$. The powder of neodymium (Nd) is formed like a plate, which has a value of X- or y-axis direction several times greater than that of Z-axis direction, a height-direction, that is, which is formed thin.

The greater the X- or Y-axis size of the neodymium (Nd) powder, the better. For instance, if the powder having an X- or Y-axis size of 45 μm or more is used, residual performance is improved. Although it is unavoidable that powder including small granules is mixed because of cracked powder of neodymium (Nd) during molding, it is desirable that half or more of the powder has a size of 45 μm or more. If 70% or more of the powder has a size of 45 μm or more, more preferable magnet performance can be provided. If 90% or more of the powder has a sized of 45 μm or more, furthermore preferable results can be provided. Incidentally, if neodymium (Nd) further contains slight dysprosium, heat resistance can be improved. Containing dysprosium can maintain satisfactory magnetic property even if the rotating electric machine rises in temperature. A content ratio of dysprosium is about several percent and 10% or less at a maximum. The magnet binding the neodymium power with $SiO_2$ mentioned above is used to provide an effect of improving magnetic property and heat resistance.

Second Embodiment

Figure 5:
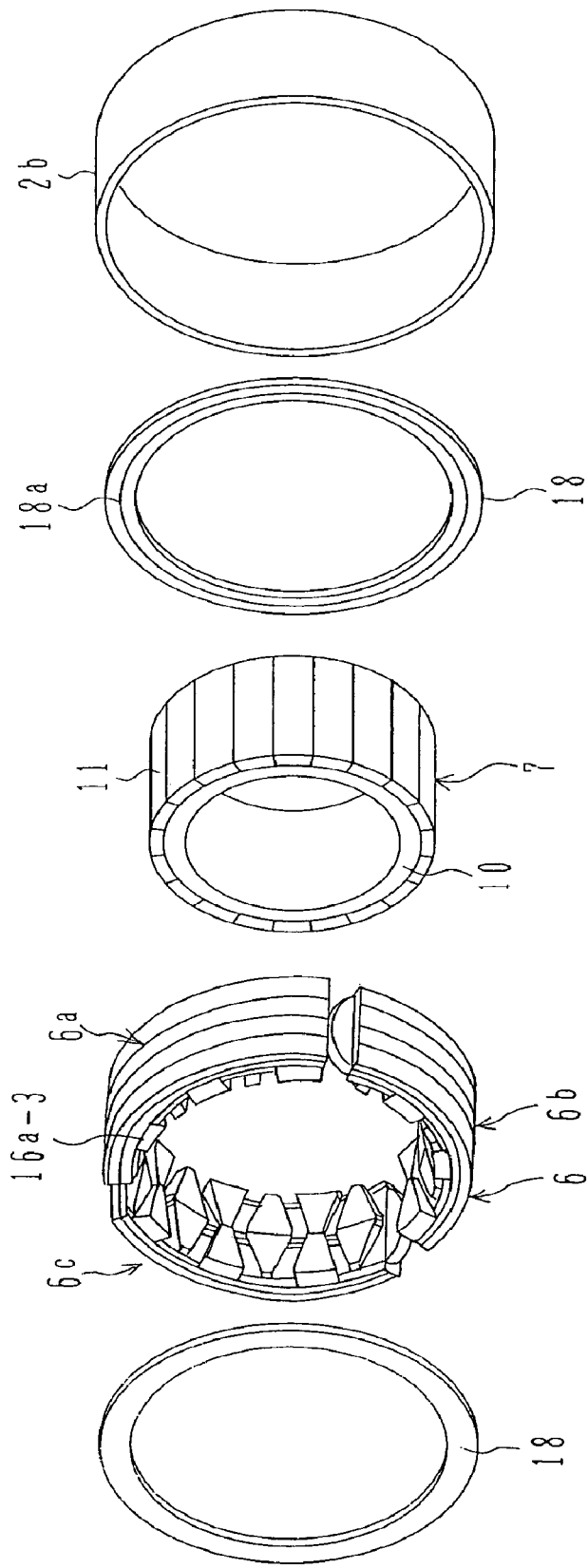
FIG. 5 is a perspective view of separate component parts of an electric motor portion of the second embodiment.

An electric water pump according to a second embodiment of the present invention is next described with reference to FIG. 5. FIG. 5 is a perspective view of an electric motor portion, separately illustrating its component parts. It is to be noted that parts common to those of the first embodiment are designated with like terms and with like reference numerals.

The second embodiment is different from the first embodiment in that the partition wall is not provided and instead an end plate 18 serving as a positioning member is provided. In the first embodiment, the stator magnetic poles 6a, 6b, 6c are secured by the inner circumference of the housing main body 2b and by the outer circumference of the partition wall 12. In the second embodiment, however, because of no partition wall, annular end plates 18 are each secured to a corresponding one of the key grooves 16a-3 located at both axial ends of the stator core 13 to fix the stator magnetic poles 6a, 6b, 6c. The end plate 18 is composed of a nonmagnetic ring-shaped member formed with a planar surface on its one axial end face and with an annular projection 18a on the other axial end face. This projection 18a is fitted into the key groove 16a-3. Both the end plates 18 are configured to axially put the stator core 13 therebetween for support. Incidentally, because of no partition wall, the present embodiment needs to seal the pump construct side and electric motor portion side by a seal structure to prevent cooling water from leaking to the electric motor portion side or to mold the inner circumference of the stator 6 with resin or the like.

Although the shaft and bearing are not illustrated at the center of the rotor 7, the present embodiment may provide the shaft 8 and bearing 9 similarly to the first embodiment and arrange reduction gears in the space portion thereof.

The configuration of the second embodiment has been described thus far. The function and effect of the second embodiment are described below.

According to the second embodiment, the positioning members for positioning the stator cores divided are each fitted into a corresponding one of the axial end faces of the stator cores. Therefore, the stator cores can be positioned at respective determined positions. In particular, if the positioning members are made of a nonmagnetic material, the stator cores can magnetically be divided.

The stator core of the second embodiment is axially divided into a plurality of stator core constituent members at least in the inside opening of the stator winding. The stator core constituent members have the same shape. The connecting member made of a magnetic material is fitted to a position which corresponds to the inside opening of the stator winding and where adjacent stator core constituent members are opposed to each other. Thus, even if a space exists, the space being provided to fit the positioning member to a position not located on the lateral end face of the stator core, the space can be buried by the connecting member made of a magnetic material, which prevents degradation in magnetic property.

Third Embodiment

Figure 6:
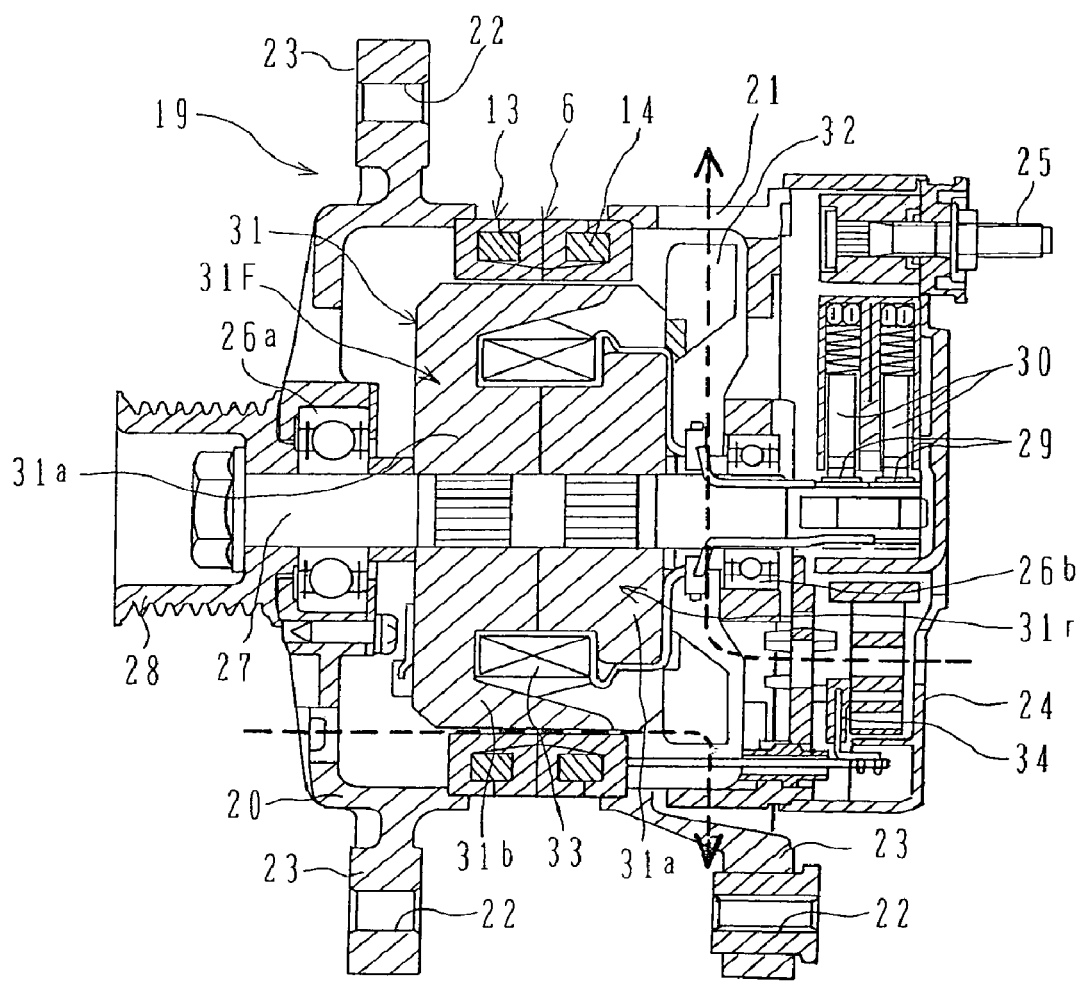
FIG. 6 is a lateral cross-sectional view of a vehicle alternating-current generator according to a third embodiment.
Figure 7:
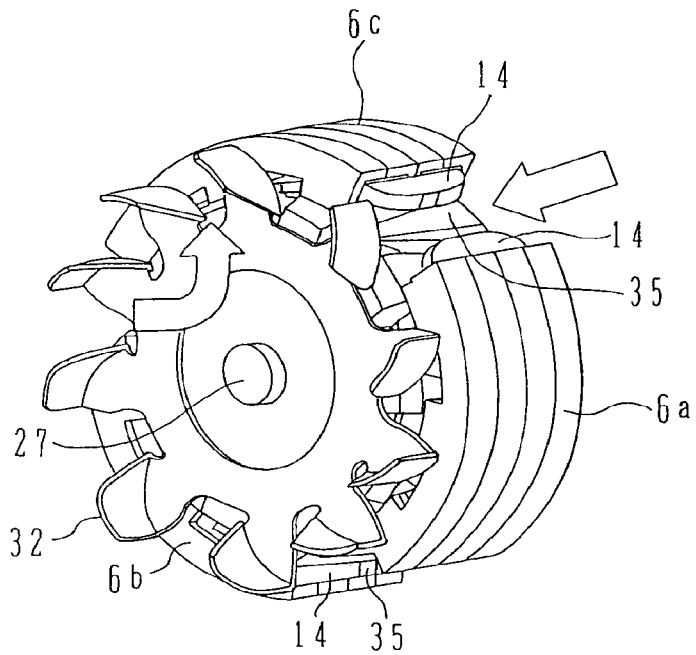
FIG. 7 is a perspective view of a rotor and a stator in the vehicle alternating-current generator of FIG. 6.
Figure 8:
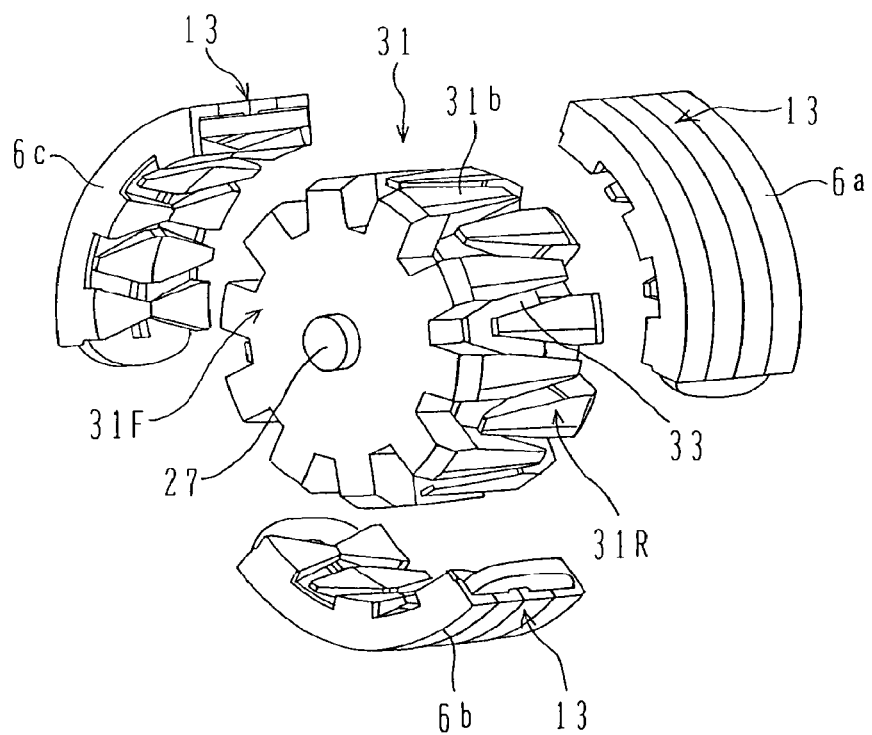
FIG. 8 is a perspective view of the rotor and stator of FIG. 7 with the stator spaced apart toward the outer circumference and with a fan secured to the rotor removed.
Figure 9:
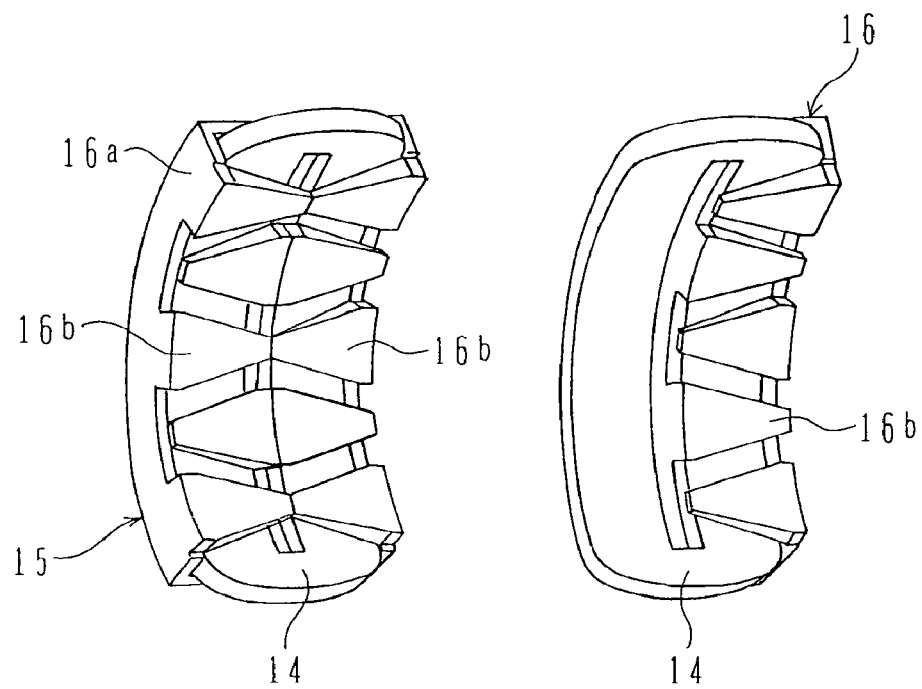
FIG. 9 is an enlarged perspective view of a W-phase magnetic pole in the stator according to a third embodiment.

A description will be made of a third embodiment of a product using a rotating electric machine embodying the present invention taking an alternating-current generator mounted on an automobile with reference to FIGS. 6 to 9. FIG. 6 is a lateral cross-sectional view of the vehicle alternating-current generator. FIG. 7 is a perspective view of a rotor and a generator. FIG. 8 is a perspective view of the rotor and generator with the stator of FIG. 7 spaced apart toward the outer circumference and with a fan attached to the rotor removed. FIG. 9 is an enlarged perspective view of a W-phase magnetic pole of the stator. It is to be noted that parts common to those of the other embodiments are designated with like terms and with like reference numerals.

The vehicle alternating-current generator 19 of the present invention shown in FIG. 6 includes a front bracket 20 disposed on the left side in FIG. 6 and a rear bracket 21 disposed on the right side in FIG. 6. Each bracket is formed in a bottomed cylinder, i.e., in a bowl-shape having a housing space therein. The brackets are each bored with variously shaped holes adapted to pass air therethrough. The front bracket 20 and rear bracket 21 are formed integrally with fixing portions 23 which project radially and outer-circumferentially and are bored with fixation holes 22. These fixing portions 23 are attached to the vehicle with bolts not shown.

A rear cover 24 thinner in thickness than each bracket is attached to an axial end of the rear bracket 21. Similarly to the brackets, the rear cover 24 is formed in a bottomed cylinder, i.e., in a bowl-shape having a housing space therein. Also the rear cover 24 is bored at the axially external end thereof with a plurality of holes adapted to pass air therethrough. Further, the rear cover is attached on its outer circumferential side with a terminal 25 connected to a battery.

Ball bearings 26a and 26b as bearings are attached to respective radially almost-central positions of the axially external end portions included in the front bracket 20 and rear bracket 21, respectively. The ball bearing 26a attached to the front bracket 20 has an external diameter than that of the ball bearing 26b attached to the rear bracket 21.

A shaft 27 is passed through the respective inner rings of the ball bearings 26a, 26b so as to be supported rotatably with respect to the front bracket 20 and rear bracket 21.

A pulley 28 as a rotation transmitting member is secured to the shaft 27 at the lateral end of the front bracket 20 with a bolt so as to be rotated integrally therewith. The rotation of an engine not shown is transmitted from a crank pulley to this pulley 28 via a belt as an endless transmission belt. Thus, the shaft 27 is rotated in proportion to the rotation number of the engine and to a pulley ratio of the pulley to the crank pulley.

Two slip rings 29 are attached to the end portion of the shaft 27 on the side of the rear bracket 21 so as to be rotated integrally with the shaft 27. Electric power is supplied through two brushes 30 which are slidably moved while pressed to the respective slip rings 29.

A front side rotor member 31F and a rear side rotor member 31R both formed of a magnetic material are separately serration-joined to the rotation-axially almost-central portion of the shaft 27 so as to rotate integrally therewith. The front side and rear side rotor members 31F, 31R are such that their outside ends are allowed to plastic-flow in annular grooves formed in the shaft 27 so as to restrict their axial movement with the rotor members axially opposed to and abutted against each other. The front side rotor member 31F and the rear side rotor member 31R both secured to the shaft 27 described above constitute a rotor 31.

A plate-like fan 32 having a plurality of blades on its outer circumferential side and serving as ventilation means is mounted to the rotary-axial end face of the rotor 31 on the side of the rear cover 24 and is rotated integrally with the rotor 31. Incidentally, the outmost diameter of the fan 32 is greater than the outer diameter of the rotor 31 and air on the inner circumferential side of the fan 32 is allowed to flow to the outer circumferential side by the centrifugal force resulting from the rotation.

The front side rotor member 31F and rear side rotor member 31R include shaft portions 31a located on the inner circumferential side and claw portions 31b located on the outer circumferential side and formed in an L-shape in axial cross-ssection. The axial end portions of the shaft portions 31a of both the rotor members 31F, 31R are opposed to and abutted against each other to constitute a Rundel-type core. A field coil 33 is wound around the rotary axis and between the outer circumference of the shaft portion 31a and the inner circumference of the claw portion 31b. Both ends of the field coil 33 extend along the shaft 27 and are each connected with a corresponding one of the slip rings 29 mentioned above. Thus, a direct current supplied from the brushes 30 through the slip rings 29 flows in the field coil 33 to magnetize the rotor 31, whereby a magnetic path is formed in the rotor 31 so as to go around the filed coil 33. The current supplied to the field coil 33 is controlled according to the condition of the battery so as to start electric generation when a generation voltage is higher than the battery voltage of the vehicle. Specifically, an IC regulator (not shown) as a voltage control circuit adapted to adjust the generation voltage is incorporated in a rectification circuit 34 described later disposed in the rear cover 24 to control the terminal voltage of the terminal 25 at constant voltage at all times.

An annular step is formed at a portion where the front bracket 20 axially faces the rear bracket 21. The stator 6 substantially identical to that of the first embodiment is fixedly put in the step in such a manner that it is circumferentially divided into a U-phase magnetic pole 6a, a V-phase magnetic pole 6b and a W-phase magnetic pole 6c. Incidentally, the arrangement of the stator magnetic poles 6a, 6b, 6c is the same as that of the first embodiment. The stator 6 is circumferentially divided and disposed between the front bracket 20 and the rear bracket 21. Thus, gaps 35 serving as air passages are formed between the stator magnetic poles 6a, 6b, 6c so as to allow air streams caused by the fan 32 to pass therethrough. The claw poles 16b of the stator 6 are opposed to the claw portion 31b of the rotor 31 with a slight gap formed therebetween.

The stator 6 is composed of the stator core 13 and stator winding 14 similarly to the first embodiment. The stator winding 14 is connected to the rectification circuit 34 attached in the rear cover 24. Further, the rectification circuit 34 is connected to the battery through the terminal 25. Incidentally, the rectification circuit 34 is composed of a plurality of diodes. The three-phase alternating-current voltage induced in the stator windings 14 of U-phase, V-phase and W-phase is subjected to full-wave rectification and converted into direct-current voltage, which is supplied to the terminal 25.

The rotor 31 is described in detail with reference to FIG. 8.

As shown in FIG. 8, the front side rotor member 31F and rear side rotor member 31R are each provided with a plurality of, e.g., ten, claw portions 31b arranged circumferentially and each formed to extend in an L-shape in cross-section from the axially external side end of the shaft portion 31a. In short, the twenty claw portions 31b in total are provided. The claw portions 31b are each formed to radially extend at almost the same width and then axially extend therefrom in such a tapered manner that its leading end is reduced in width. The tapered portion of the claw portion 31b is largely chamfered at a lateral edge of the anti-rotational direction. The front side rotor member 31F and rear side rotor member 31R thus formed are secured to the shaft 27 in such a manner that the field coil 33 is disposed therebetween and the claw portions 31b are arranged circumferentially alternately with the ends of the shaft portions 31a abutted against each other.

The fan 32 as shown in FIG. 7 is mounted to the axially external end of the rear side rotor member 31R by welding or the like. This fan 32 is a centrifugal fan in which one circumferential side of a projecting portion of a metal plate circumferentially formed with a plurality of projections is bent almost arcuately and almost vertically by a press machine to integrally form blades each having a slant surface slant with respect to the radial direction. Thus, when the fan 32 is rotated clockwise in FIG. 7 to allow air to flow in a direction designated with an arrow, that is, from the inner circumferential side to the outer circumferential side.

The stator 6 is next described in detail with reference to FIG. 9.

The stator 6 of the present embodiment is almost identical to that of the first embodiment as described earlier. However, the number of the claw poles is five, the odd number, for each stator sub-core 5 as shown in FIG. 9. Along with this, the coil end portions 14a of a stator winding 14 protrude from both the circumferential ends of a stator core 13.

The stator cores 13 are each composed of four stator core constituent members 16. The number of claw poles 16b opposed to each other in each stator sub-core 15 is two, the even number, and the number of claw poles 16b on the axially external side is three, the odd number. Thus, two kinds of the stator core constituent members 16 are required. Of the two, the stator core constituent member 16 having the three claw poles 16b are configured so as to be arranged at both circumferential ends and at a circumferentially almost-central portion. The stator core constituent member 16 having the two claw poles 16b is configured such that two claw poles 16b are evenly arranged with a space for a single claw pole 16b made at each of both the circumferential ends. The stator core constituent members 16 of the two kinds constructed as above are axially assembled with each other so as to alternately arrange their claw poles 16b, thus, forming the stator sub-core 15. Further, the two stator sub-cores 15 are axially assembled with each other so as to be symmetrical, thereby forming the stator core 13. Since the stator core 13 has the claw poles 16b at both the circumferential ends, the coil end portions 14a of the stator winding 14 respectively protrude from both the circumferential ends of the stator core 13.

The operation of the present embodiment is next described.

Along with the start of the engine, rotation is transmitted from the crankshaft through the belt to the pulley 28, thus rotating the rotor 31 via the shaft 27. At this moment, direct current is supplied from the brushes 30 through the slip rings 29 to the field coil 33 provided on the rotor 31 to generate a magnetic flux circulating the inner and outer circumferences of the field coil 33. This alternately forms N-poles and S-poles on the claw portions 31b of the rotor 31. The magnetic flux of the field coil 33 passes from the N-pole claw portion 31b of the front side rotor member 31F through one side claw magnetic pole 16b of the stator core 13, circulating around the stator winding 14, and reach the other side claw pole 16b. Further, the magnetic flux reaches the S-pole claw portion 31b of the rear side rotor member 31R. In this way, a magnetic circuit circulating the rotor 31 and the stator 6 is formed. Such a magnetic circuit is generated for each phase, thereby generating three-phase alternating-current induced voltage in the stator winding 14.

The alternating current voltage thus generated is subjected to full-wave rectification by the rectification circuit 34 to be converted into direct-current voltage. The direct-current voltage thus rectified is sent to the terminal 25 connected to the battery. The magnitude of the induced voltage varies in conjunction with field current and with the number of rotation. In order to make the voltage of the battery connected to the terminal constant, it is necessary therefore to control current applied to the field coil 33 in response to the number of rotation. The control of current applied to the field coil 33 is exercised by an IC regulator (not shown) incorporated in the rectification circuit 34.

When the rotor 31 rotates, the fan 32 rotates together with the rotor 31. The fan 32 is mounted on the rotor 31 only on the side of the rear cover 24. Thus, as designated with dashed arrows in FIG. 6, outside air enters the holes bored in the front bracket 20, passing through the air passages 35 defined between the stator magnetic poles 6a, 6b, 6c, and flows out of the holes bored in the rear bracket 21 on its radial outside. In addition, outside air enters the holes bored in the axial ends of the rear bracket 21 and rear cover 24, merging with the air flowing in from the side of the front bracket 20, and flows out from the holes bored in the rear bracket 21 on the radial outside. In this way, the stator 6, rotor 31 and rectification circuit 34 are cooled. In particular, the stator windings 14 projecting from both the circumferential sides of the air passages 35 are cooled by the air passing through the air passages 35. Consequently, the stator 6 can sufficiently be cooled.

The configuration of the third embodiment has been described thus far. The function and effect of the third embodiment are described below.

According to the third embodiment, the alternating-current generator includes the stator and the rotor. The stator includes a plurality of stator windings arranged at predetermined intervals and a stator core. The stator core includes a stator yoke and a plurality of claw poles which protrude from the stator yoke toward the rotor side through the inside opening and outside of the stator winding. The stator yoke is magnetically divided in association with the stator winding. The magnetic flux generated by the rotor passes through the claw poles to be interlinked with the stator winding. The magnetic flux interlinked with the stator winding varies based on the rotation of the rotor to induce voltage in the stator winding. Thus, the magnetic flux will not leak to the other stator winding side to improve generating efficiency. Further, the magnetic flux will hardly come and go between the stator windings to reduce variations of the magnetic flux between the phases. Since each phase is configured as an independent magnetic circuit, even if the axial thickness is increased, a balance between the magnetic flux interlinked with each phase and the inductance of the winding is satisfactory.

The alternating-current generator of the third embodiment is provided with the air passages adapted to axially pass air therethrough between the stator windings thereof and with the ventilation means for allowing air to flow through the air passages. Thus, the effect of cooling the stators can be improved. In particular, if the odd number of claw poles is provided for each magnetically divided stator yoke, then the coil end portions of the stator winding will protrude from both the circumferential ends of the stator core. The effect of cooling the stator winding can further be improved.

According to the alternating-current generator of the third embodiment, the rotor is disposed on the inner circumferential side of the stator cores and the ventilation means is composed of a fan provided at least on one axial end side of the rotor and having the outer diameter greater than that of the rotor. Thus, the amount of ventilation air can be increased, which can improve the cooling effect. Incidentally, since the stator of the present embodiment is divided into segments in the circumferential direction, it is possible to assemble the stator magnetic poles to the rotor from the outer circumferential side. Thus, although the outer diameter of the fan is greater than that of the rotor, the fan can be assembled.

The fan attached to the rotor of the alternating-current according to the third embodiment is attached only to the end face thereof on the side where the rectification circuit is disposed. Although the fan is single, air can be allowed to flow from both the axial ends of the rotor to the outer circumferential side thereof. Thus, even the single fan can sufficiently cool the rectification circuit and the stator.

The stator of the alternating-current generator according to the third embodiment is such that the stator core is divided into segments for each stator winding; therefore, component replacement is enabled for each phase. This provides the function and effect that even if a failure occurs, the minimum component replacement enables maintenance.

The function and effect of the third embodiment has been described thus far. Other applicable configurations are described below.

The stator winding is designed to protrude from both the circumferential ends of the stator core in the third embodiment. However, similarly to the first embodiment, the stator winding protrudes only from the one circumferential end side of the stator core, which provides the cooling effect. In this case, since the circumferential gap between the adjacent stator magnetic poles can be reduced, variations in the pitches of the claw poles can be reduced as much as possible.

The stator core is divided into segments for each stator winding in the third embodiment. However, their stator yokes may integrally be made of a nonmagnetic member and an air passage may be formed in the nonmagnetic member. In this way, each stator core can circumferentially be positioned with ease. Incidentally, exposition of the stator winding to the inside of the air passage can improve the cooling effect.

The third embodiment is described through the three-phase three-pole stator. In order to reduce an influence on the eccentricity of the rotor, the stator may be configured so as to be of a three-phase six-pole, and to be arranged at intervals of about 60 degrees in mechanical angle and at a phase difference of three-phase. In this case, the efficiency on the eccentricity can be reduced by arranging the same-phase coils on the diagonal line.

Fourth Embodiment

Figure 10:
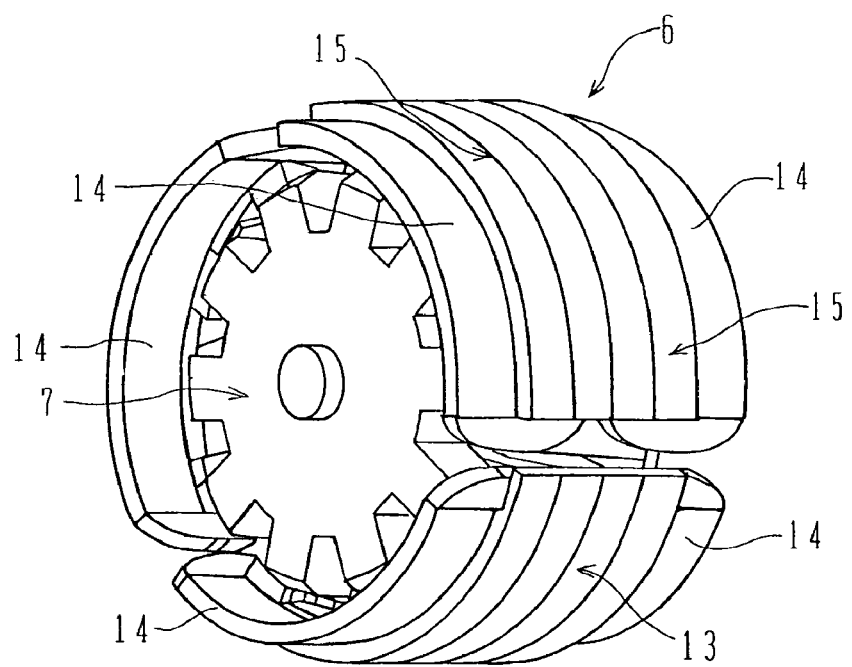
FIG. 10 is a perspective view of a stator and a rotor according to a fourth embodiment.

A fourth embodiment is described in which the stator of the vehicle alternating-current generator is modified, with reference to FIG. 10. FIG. 10 is a perspective view of a stator and a rotor. It is to be noted that parts common to those of the other embodiments are designated with like terms and with like reference numerals.

A stator 6 of the fourth embodiment is such that two stator windings 14 are wound for each phase. In other words, the stator winding 14 is wound for each stator sub-core 15. Thus, the stator winding 14 goes around the outside of the one axial end of the stator core 13. A pair of the stator sub-cores 15 thus constructed are fixedly abutted against and opposed to each other so as to be paired at the axial end portion where the stator winding 14 is not wound. Thus, the stator 6 is configured such that the stator windings 14 protrude from both the axial ends of the stator core 13. Incidentally, the two stator windings 14 wound around the same phase is connected in series with each other.

Since the stator windings 14 are exposed to both the axial ends of the stator cores 13 as described above, the effect of cooling the stator windings 14 can be improved. Further, if a fan is arranged in the inner circumferences of the protruding portions of the stator windings 14, the further cooling effect can be expected. In this case, if the fans are mounted to both the axial ends of the rotor 7, both the stator windings can be cooled.

Fifth Embodiment

Figure 11A:
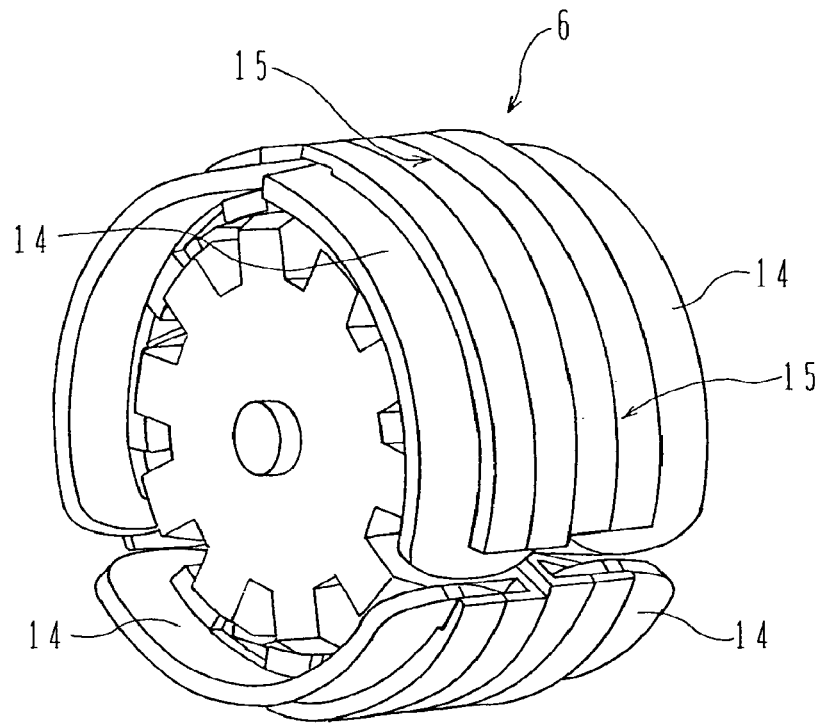
FIG. 11A is a perspective view of a stator and a rotor according to a fifth embodiment.
Figure 11B:
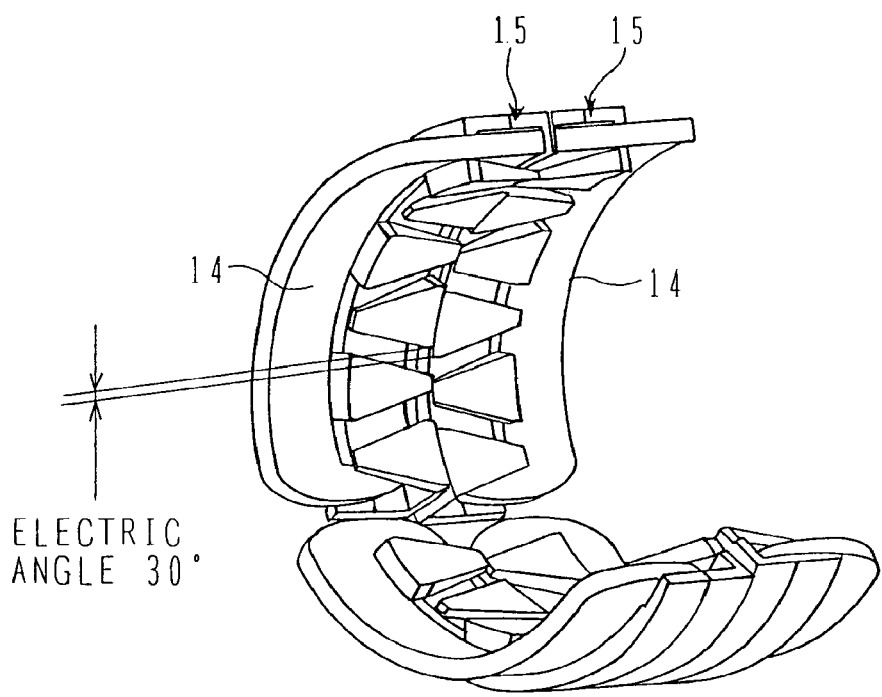
FIG. 11B is a perspective view illustrating only a V-phase magnetic pole and a W-phase magnetic pole according to the fifth embodiment.

A fifth embodiment is described in which the stator of the vehicle alternating-current generator is further modified, with reference to FIGS. 11A and 11B. FIG. 11A is a perspective view of a stator and a rotor, and FIG. 11B is a perspective view illustrating only a V-phase magnetic pole and a W-phase magnetic pole. It is to be noted that parts common to those of the other embodiments are designated with like terms and with like reference numerals.

A stator 6 of the fifth embodiment is similar to the stator 6 of the fourth embodiment. However, the stator 6 of the fifth embodiment is different from that of the fourth embodiment in that six stator windings 14 are made independent of each other and one axial end side three-phase windings and the other axial end side three-phase windings have a phase-difference of 30 degrees in electric angle between the same phase coils. In other words, a pair of stator sub-cores 15 are arranged to be offset from each other by an electric angle of 30 degrees. This can provide a six-phase stator 6.

The six-phase stator 6 thus configured can produce the function and effect that full-wave rectification provides direct-current voltage with a low voltage-ripple.

The inventions comprehendable from the embodiments described above and other than the inventions recited in the following claims are described below together with their function and effect.

(1) A vehicle alternating-current generator comprising:
a stator including:
a stator core having a plurality of circumferentially arranged magnetic pole portions; and
a plurality of stator windings each wound at a predetermined circumferential angle;
wherein an air passage located between the stator core windings and adapted to enable air to flow at least one of coil end portions; and
a rotor provided rotatably with respect to the stator and having a plurality of magnetic poles opposed to the magnetic pole portions of the stator core.

With such a configuration, the function and effect almost similarly to those of claim 17 can be provided. However, the main object of this invention is to cool the stator winding; therefor, it is not needed to magnetically divide the stator core.

(2) The vehicle alternating-current generator recited in item (1), wherein a fan is provided only on one axial end side of the rotor so as to allow air to flow the air passage, and a rectification circuit is provided to rectify voltage induced in the stator winding, and the generator includes a path adapted to allow air, caused by rotation of the fan, to flow via the rectification circuit and toward the outer circumferential side of the fan and another fan adapted to allow air to flow from the other axial end side where the fan is not provided in the rotor through the air passage to the outer circumferential side of the fan.

With such a configuration, even the single fan can cool the rectification circuit, the stator and the rotor.

(3) The vehicle alternating-current generator recited in item (1), wherein a fan is provided only on one axial end side of the rotor so as to allow air to flow the air passage, the stator winding is wound to be exposed from the stator core on the axial end side of the stator core, the fan is formed to have a diameter smaller than the inner diameter of the stator winding exposed to the axial end side of the stator core and to dispose in the inner circumference of the stator winding, and the stator winding exposed to the axial end side of the stator core is wound to increase its diameter toward the axial end face. With such a configuration, resistance of air flowing from the fan toward the outer circumferential side can be suppressed. Thus, an air flow rate is increased to improve an cooling effect and air resistance applied to the rotor can be reduced.

What is claimed is:

1. A rotating electric machine comprising:
   a stator; and
   a rotor;
   wherein said stator includes a plurality of stator windings circumferentially arranged at predetermined intervals and a stator core,
   said stator core includes a stator yoke and a plurality of claw poles extending from said stator yoke, passing through an inside opening and an outside of said stator winding and protruding toward the side of said rotor, and
   said stator yoke is magnetically divided in association with said stator winding,
   wherein said stator core is divided into a pair of segments each located from the inside opening of said stator winding to a corresponding one of both the axial sides thereof.

2. The rotating electric machine according to claim 1, wherein said stator core is axially divided into four stator core constituent members at the inside opening of said stator winding and at the position of said stator winding, said stator core constituent members being formed to have the same shape.

3. The rotating electric machine according to claim 1, wherein said stator winding is wound to be exposed from said stator core on an axial end side of said stator core, and wherein said stator cores are opposed to each other for forming a pair on the side where said stator winding is not exposed.

4. A rotating electric machine comprising:
   a stator; and
   a rotor;
   wherein said stator includes a plurality of stator windings circumferentially arranged at predetermined intervals and a stator core,
   said stator core is configured to be provided alone a circumferential portion of said stator winding and to form a plurality of magnetic poles on the side of said rotor, and said stator core is divided for each of said stator windings,
   wherein a positioning member for positioning said stator core is fitted to an axial end face of each of the divided stator cores.

5. The rotating electric machine according to claim 4, wherein said stator core is axially divided into a plurality of stator core constituent members with respect to the inside opening of said stator winding, said stator core constituent members having the same shape, and a connecting member made of a magnetic material is fitted to said stator core constituent members at a position corresponding to the inside opening of said stator winding and where said stator core constituent members are opposed to each other.

* * * * *